No. 648,545. Patented May 1, 1900.
R. L. ADAMS.
COFFEE OR TEA MAKER.
(Application filed Aug. 12, 1899.)
(No Model.)
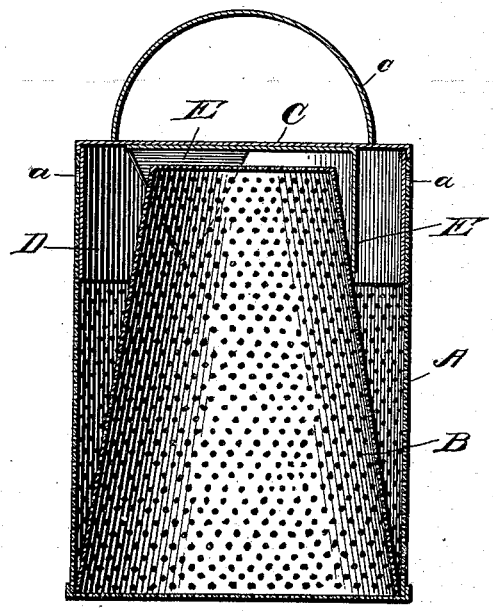
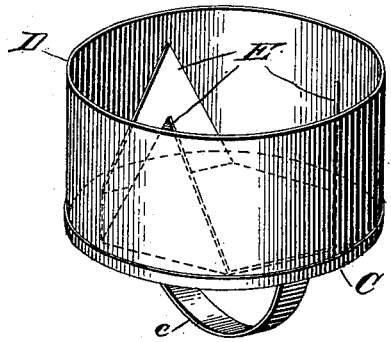
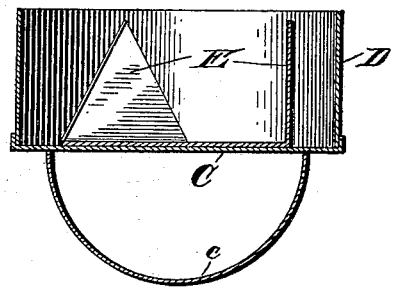
WITNESSES
Louis D. Heinrichs
F. O. McCleary
INVENTOR
Robert L. Adams
By Victor J. Evans
Attorney

UNITED STATES PATENT OFFICE.

ROBERT L. ADAMS, OF NEW ORLEANS, LOUISIANA.

COFFEE OR TEA MAKER.

SPECIFICATION forming part of Letters Patent No. 648,545, dated May 1, 1900.

Application filed August 12, 1899. Serial No. 727,066. (No model.)

*To all whom it may concern:*

Be it known that I, ROBERT L. ADAMS, a citizen of the United States, residing at New Orleans, in the parish of Orleans and State of Louisiana, have invented certain new and useful Improvements in Coffee or Tea Makers, of which the following is a specification.

This invention relates to certain new and useful improvements in coffee and tea makers of that class in which is provided a conical foraminous portion or cylinder; and the present invention has for one object to provide a simple and improved construction of this character, whereby the device may be used for making tea or coffee of any kind free from grounds and sediment, the coffee being filtered through first one perforated receptacle and then through the other.

Still a further object is to provide a lid or cover of such character that it will serve to properly hold the conical foraminous portion centrally, and this lid or cover is adapted to serve the further function of a biscuit-cutter, being provided with downwardly-depending portions, serving to prick the biscuit as it is cut, and thus adapt it to rise more rapidly, and these depending portions serve to center the inner or conical portion of the digester and hold it fixedly in position. This lid or cover forms a steam chamber or reservoir into which the steam rises and in which it is condensed. When desired, the receptacle may be used as a strainer.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a vertical section showing my invention. Fig. 2 is a perspective view of the cover detached, and Fig. 3 is a vertical section through the same.

Like letters of reference indicate like parts throughout the several views.

In referring to the details of the drawings by letters, A designates a cylinder of any required capacity open at the top and having reticulated sides and bottom, as illustrated. This cylinder is designed to be inserted in any suitable receptacle in which it may be desired to make the coffee or tea. It is shown as provided near its upper end with openings *a* for the attachment of a handle or for the insertion of the tine of a fork for easy manipulation or handling of the cylinder when required.

B is a cone-shaped part open at the bottom and having reticulated wall and top, as illustrated. The bottom of this cone is of a diameter substantially the same as that of the cylinder into which it is designed to be inserted, with the lower edge resting upon the bottom of said cylinder. In this instance the inner portion is shown as truncated; but it is evident that it may be extended more or less, as may be found desirable.

C is the cover or lid. It is provided with a handle *c* and a downwardly-depending annular flange D and is adapted to snugly fit within the open end of the cylinder A. Depending from the under side of the top of this cover within the space inclosed by the annular flange are a series of projections or spurs E, which may assume any desired shape, being shown as tapered or triangular, although this is not essential. In practice the cover serves, by reason of the depending portions thereof, to center the conical portion, the projections or points on the cover engaging the outer surface of the conical portion in a manner which will be readily understood. When not in use upon the cylinder, the cover may be used for the purpose of cutting biscuits, in which case the projections or spurs serve to enter the dough at the time the biscuit is cut by the surrounding flange, and thus they prick the dough and aid in the raising of the same. The cylinder serves to give the coffee a second filtering and retains therein what small particles of the coffee-grounds may perchance escape through the openings in the inner or cone-shaped portion. The cover being steam-tight, when it becomes filled with hot and increasing steam it will rise up through the water in the coffee-pot or other receptacle, carrying the maker and contents with it, and after discharging the steam will sink again, and this motion will be continued as long as the making process proceeds, thus securing all the strength from the coffee.

What I claim as new is—

1. A device for the purpose described comprising a reticulated cylinder, a reticulated cone-shaped part removably inserted therein and a lid adapted to fit within the cylinder and to center the cone-shaped part therein, substantially as described.

2. In a device for the purpose described, a cover having a handle and a depending flange and sharpened portions projecting from the under side of the top of the cover and located in the space confined within said flange, substantially as described.

3. The combination with a reticulated cylinder and a reticulated cone therein, of a cover having a flange adapted to snugly fit within the upper end of the cylinder and having portions depending from the under side of its top to serve as means for centering the cone and to serve also in conjunction with the flange as a biscuit cutter and pricker, substantially as described.

In testimony whereof I affix my signature in presence of two witnesses.

ROBERT L. ADAMS.

Witnesses:
CLIFTON WASHINGTON,
LOUIS WILLIAMS.